United States Patent [19]
Fredriksson et al.

[11] Patent Number: 6,140,712
[45] Date of Patent: Oct. 31, 2000

[54] WAVE ENERGY CONVERTER

[75] Inventors: Gunnar Fredriksson, Bettna; Bengt-Olov Sjöström, Göteborg; Lennart Claesson; Jan Forsberg, both of Angered, all of Sweden

[73] Assignee: IPS Interproject Service AB, Bettna, Sweden

[21] Appl. No.: 09/171,913

[22] PCT Filed: Apr. 29, 1997

[86] PCT No.: PCT/SE97/00719

§ 371 Date: Oct. 29, 1998

§ 102(e) Date: Oct. 29, 1998

[87] PCT Pub. No.: WO97/41350

PCT Pub. Date: Nov. 6, 1997

[30] Foreign Application Priority Data

Apr. 29, 1996 [SE] Sweden .................................. 9601638

[51] Int. Cl.[7] .................................................. F03B 13/12
[52] U.S. Cl. .................................................. 290/53; 60/501
[58] Field of Search .................................. 290/42, 43, 53, 290/54; 60/500, 501, 502

[56] References Cited

U.S. PATENT DOCUMENTS

| | | |
|---|---|---|
| 1,864,499 | 6/1932 | Grigsby . |
| 3,487,228 | 12/1969 | Kriegel ...................................... 290/52 |
| 4,076,467 | 2/1978 | Persson ................................... 417/478 |
| 4,203,294 | 5/1980 | Budal et al. ............................... 60/497 |
| 4,208,878 | 6/1980 | Rainey ...................................... 60/496 |
| 4,277,690 | 7/1981 | Noren ........................................ 290/53 |
| 4,531,063 | 7/1985 | Vielmo et al. ............................ 290/53 |
| 4,631,921 | 12/1986 | Linderfelt ................................. 60/501 |
| 4,773,221 | 9/1988 | Noren ........................................ 60/501 |

FOREIGN PATENT DOCUMENTS

| | | |
|---|---|---|
| 0 594 537 | 4/1994 | European Pat. Off. . |
| 39 38 667 | 5/1991 | Germany . |
| 2 007 314 | 5/1979 | United Kingdom . |

*Primary Examiner*—Nick Ponomarenko
*Attorney, Agent, or Firm*—Larson & Taylor PLC

[57] ABSTRACT

A wave energy converter includes a buoyant body (11) and an acceleration tube (14) dependent from and attached to the buoyant body (11) and having an upper end near the buoyant body and a lower end remote from the buoyant body. A section of the acceleration tube intermediate the upper and lower ends of the acceleration tube defines a working cylinder (16) and openings in the acceleration tube (14) above and below the working cylinder (16) allow substantially unobstructed water flow between the working cylinder and a body of water in which the acceleration tube is immersed. A working piston (17) is reciprocable in the working cylinder. An energy-absorbing device (18, 19, S) includes paired resiliently extendable hose pumps (18, 19) operated by the working piston (17). One end of each hose pump within a pair is attached to the operating piston (17) on opposite sides thereof, and the other end is anchored to the unit which consists of the buoyant body (11) and the acceleration tube (14).

4 Claims, 2 Drawing Sheets

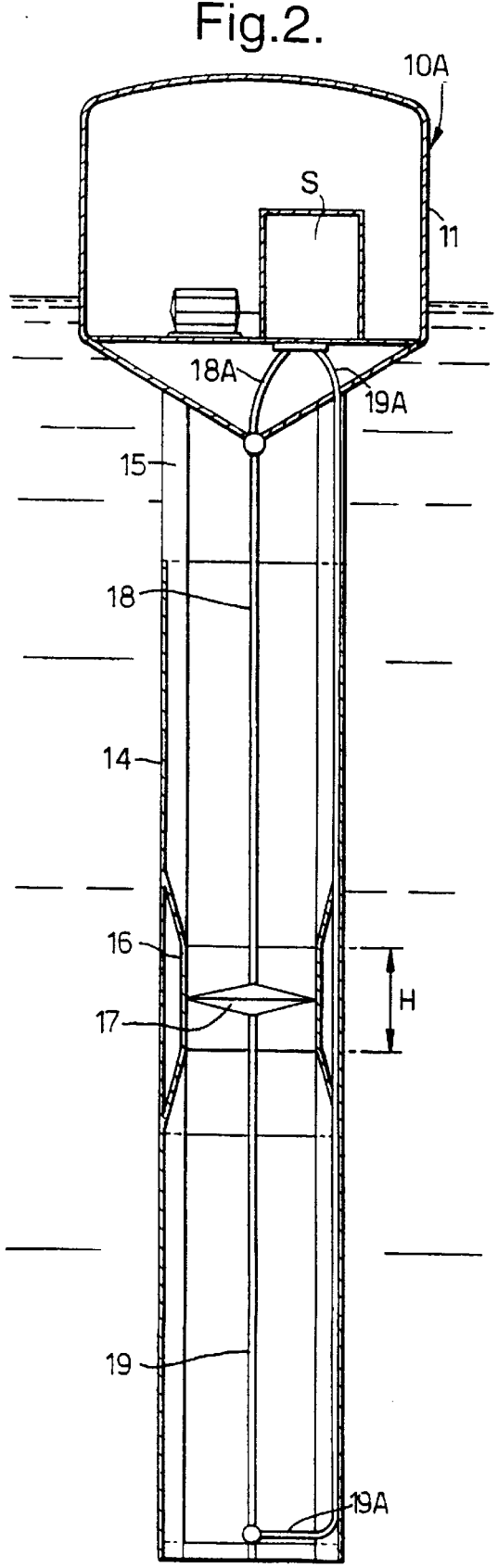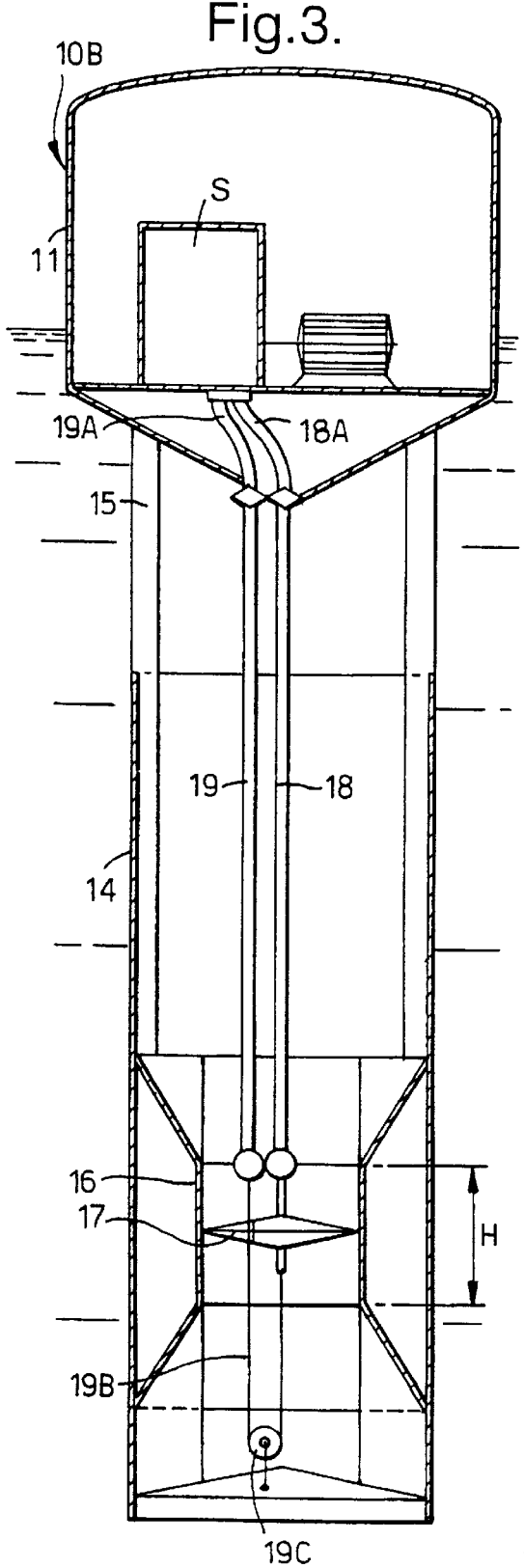

WAVE ENERGY CONVERTER

FIELD OF THE INVENTION

This invention relates to a wave energy converter using a working piston reciprocal in an acceleration tube, and more particularly to a wave energy converter having using paired resiliently extendable hose pumps.

BACKGROUND OF THE INVENTION

Wave energy converters of this kind, which are sometimes referred to as point absorbers or heaving-buoy wave energy converters, are known from, for example, U.S. Pat. No. 4,277,690. The operation of this particular converter is based on relative motion between, on the one hand, a buoyant body and a so-called acceleration tube attached to and depending from the buoyant body, and, on the other hand, a reciprocable working piston in the acceleration tube; this relative motion is caused by waves of the sea in which the converter operates.

In a wave energy converter of this kind, the working piston and other masses coupled to it form an inertial system which has no positive coupling to the buoyant body and the acceleration tube in the vertical direction, that is, in the direction of the axis of the acceleration tube.

Naturally, the working piston itself and the associated piston rod have a certain mass, but the mass which moves with the piston is determined primarily by the mass of a column of water which is coupled to the piston to move together with it.

In the wave energy converter known from U.S. Pat. No. 4,277,690 an energy-absorbing device for recovering the wave energy includes a double-acting hydraulic piston pump positioned in the buoyant body and connected to the working piston in the acceleration tube through a piston rod. The piston rod is in some respects a critical component.

BRIEF SUMMARY OF THE INVENTION

A primary object of the invention is to provide a wave energy converter in which a piston rod is not required to transmit the force required to drive the pump unit.

As will be described in greater detail below, this object is achieved by using a different type of pump unit, namely a pair of so-called hose pumps which are resiliently extendable and connected between, on the one hand, opposite sides of the operating piston and, on the other hand, the buoyant body and/or the acceleration tube.

BRIEF DESCRIPTION OF THE DRAWINGS

The invention will be described in greater detail below with reference to the accompanying drawings.

FIG. 2 is a vertical sectional view of the wave energy converter shown in FIG. 1; and FIG. 3 is a vertical sectional view of a modification of the wave energy converter shown in FIG. 2.

DETAILED DESCRIPTION OF THE INVENTION

Figure 1:
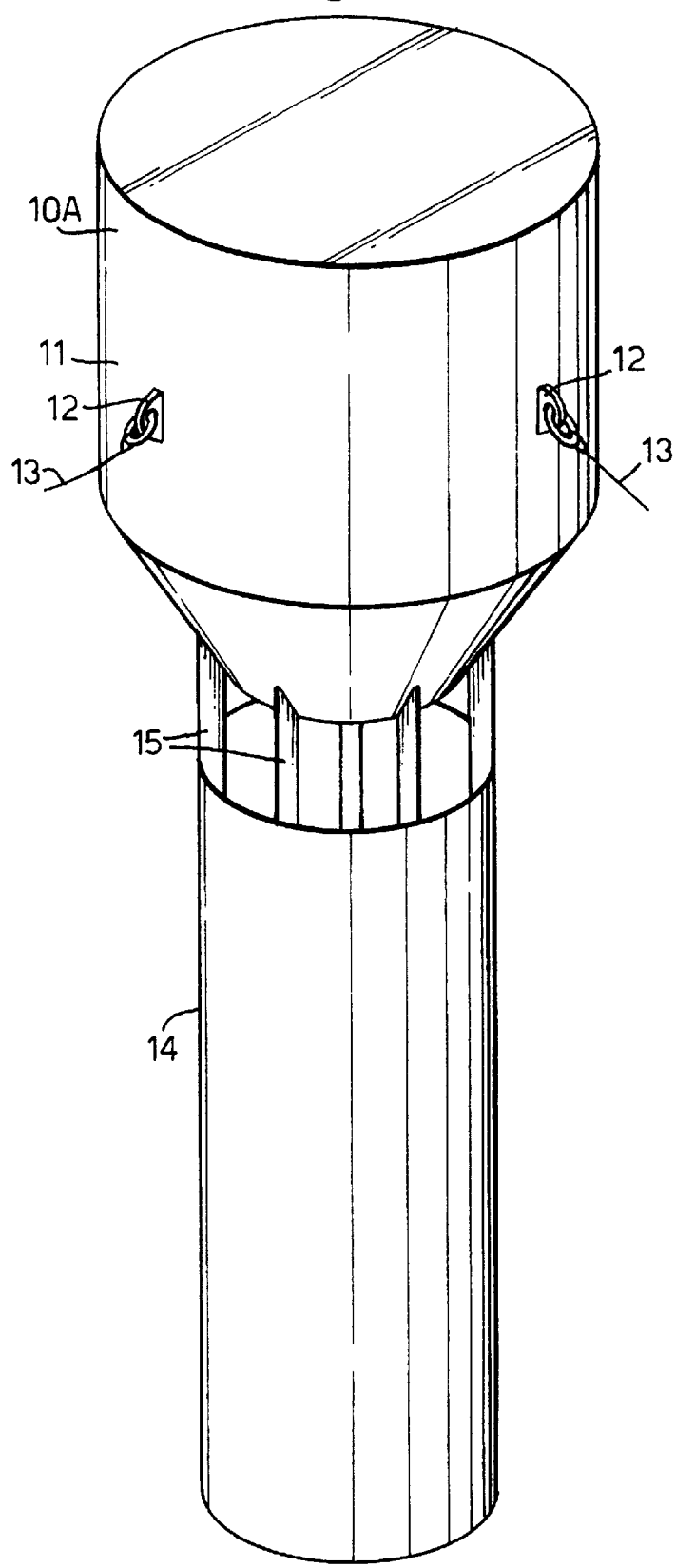
FIG. 1 is a diagrammatic perspective view of a wave energy converter of the kind with which the invention is concerned.

The wave energy converter 10A shown in FIG. 1 embodies the principles of construction and operation described in U.S. Pat. No. 4,277,690 and U.S. Pat. No. 4,773,221. It accordingly comprises a buoyant unit or body 11 provided with attachment lugs 12 for mooring lines 13, and a so-called acceleration tube 14 which depends from the buoyant body 11 and is attached to it by circumferentially spaced longitudinally extending radial webs 15 leaving large openings between them.

As in the wave energy converters of the above-mentioned patents, the acceleration tube 14 is open at both ends so that water can flow freely into and out of it.

As is illustrated in greater detail in FIG. 2 and described below, the buoyant body 11 and the acceleration tube 14 accommodate apparatus for converting wave-generated vertical oscillations of the buoyant body 11 and the acceleration tube 14 to electrical energy.

In operation of the wave energy converter 10A the entire acceleration tube 14 and the lower portion of the buoyant body 11 are immersed in water. The mooring lines 13 keep the wave energy converter 10A in a selected offshore position horizontally but permit it to oscillate vertically under the influence of water waves.

Referring to FIG. 2, a section of the acceleration tube 14 between the upper and lower ends thereof defines a working cylinder 16 in which a double-acting working piston 17 is reciprocable in the longitudinal direction of the acceleration tube.

Opposite sides of the working piston 17 are attached to a pair of single-acting so-called hose pumps, namely an upper hose pump 18 and a lower hose pump 19, which extend substantially along the axis of the acceleration tube 14. The lower end of the upper hose pump 18 is attached to the upper side of the working piston 17 while the upper end is anchored to the buoyant body 11 and connected to a hydraulic system S (not shown in detail but may be as shown and described in U.S. Pat. No. 4,277,690) within the buoyant body 11 through a hydraulic fluid line 18A. The upper end of the lower hose pump 19 is attached to the lower side of the working piston and the lower end is attached to the lower portion of the acceleration tube 14 and connected to the hydraulic system S through a hydraulic fluid line 19A.

The length or height H of the working cylinder 16 is chosen such that the working piston 17 will normally reciprocate within the working cylinder, in which it forms a barrier to flow of water through the working cylinder. However, there is a possibility for the working piston 17 to move in either direction beyond the end of the working cylinder 16.

To prevent overloading of the hose pumps 18, 19 in case the working piston 17 is driven past the end of the working cylinder 16, a relief system is provided at each end of the working cylinder. This relief system operates as described in U.S. Pat. No. 4,773,221 to substantially relieve the working piston 17 from fluid forces when it moves out of the working cylinder 16 so that further movement of the working piston in the same direction is limited.

To provide for such relief, the working cylinder 16, which is fully open towards the upper and lower sections of the acceleration tube 14, is narrower than the adjoining portions of the acceleration tube. Accordingly, as soon as the working piston 17 moves beyond one end of the working cylinder 16, water can flow more or less freely through a passage formed between the periphery of the working piston and the inner wall of the acceleration tube 14 at the wider portion thereof. In other words, a substantially unrestricted flow path is established between the open upper and lower ends of the acceleration tube 14.

The hose pumps 18, 19 are of a kind which is known per se and may be of the type disclosed in SE-B-409 493 or U.S.

Pat. No. 4,076,467. Accordingly, each hose pump comprises a resilient tube which when extended longitudinally contracts radially, so that its volumetric capacity decreases (so that water therein is pumped thereout), and expands radially when relaxed from the longitudinal extension so that its volumetric capacity increases (so that the water can be drawn therein). As is described in greater detail in SE-B-409 493, the elongation versus volume characteristics of the hose pumps can be adjusted by varying the pitch of helically wound reinforcement threads embedded in the elastomeric material of the hoses.

The valve action required for the pumping is provided by non-return valves in the hydraulic system S.

As will be readily appreciated, the hose pumps 18, 19 will operate in substantially the same manner as the double acting hydraulic piston pump shown in U.S. Pat. No. 4,277,690 as far as the pumping of the hydraulic fluid is concerned. In addition, however, the hose pumps 18, 19 will function as restoring means for the working piston.

When the working piston 17 is at rest in the working cylinder 16, that is, when it is not subjected to fluid forces resulting from acceleration of the buoyant body 11 and the acceleration tube 14, both hose pumps 18, 19 are equally extended and tensioned so that they keep the working piston centered in the working range. In operation of the wave energy converter 10A, when the working piston 17 is reciprocated in the working cylinder 16, the hose pumps 18, 19 will alternately become additionally tensioned and relaxed so that they alternately decrease and increase their volumetric capacity in push-pull fashion. If the working piston 17 should be driven out of its normal working range and thus relieved from all or most of the fluid forces which act on it, the force applied to it by the additionally tensioned hose pump will prevail over the force applied to it by the relaxed pump and thus tend to return the working piston into the working cylinder.

The wave energy converter 10B shown in FIG. 3 differs from that shown in FIG. 2 only in that the two hose pumps 18, 19 are positioned side by side above the working piston 17. The hose pump 18 is attached between the buoyant body 11 and the upper side of the working piston 17 as in FIG. 2, while the hose pump 19 is also anchored to the buoyant body 11 and connected to the lower side of the working piston through the intermediary of a motion transmitting device, here exemplified by a cable 19B and a pulley 19C. The arrangement of the hose pumps which is shown in FIG. 3 is particularly suitable for wave energy converters designed for operation in shallow waters.

A characteristic of hose pumps which is very favourable in the application according to the present invention is their non-linear, progressive spring rate. Thus, the initial elongation requires a relatively small tensile force while additional elongation requires a greater tensile force per unit length of elongation. With an appropriate design and dimensioning of the hose pumps the spring rate will be relatively low as long as the working piston reciprocates within the working cylinder, while it will increase sharply when the working piston approaches and moves past the ends of the working cylinder, so that an adequate returning force is applied to the working piston when it moves out of the working cylinder.

Naturally, more than two hose pumps may be positioned in the acceleration tube 14, on opposite sides of the working piston 17 as in FIG. 2 or side by side as in FIG. 3.

What is claimed is:

1. A wave energy converter comprising:

a buoyant body, an acceleration tube dependent from and attached to the buoyant body and having an upper end near the buoyant body and a lower end remote from the buoyant body, a section of the acceleration tube intermediate the upper and lower ends of the acceleration tube defining a working cylinder, openings in the acceleration tube above and below the working cylinder allowing in operation of the wave energy converter substantially unobstructed water flow between the working cylinder and a body of water in which the acceleration tube is immersed, a working piston which is reciprocable in the working cylinder, and an energy-absorbing device including a pump unit driven by the working piston, wherein the pump unit is positioned inside the acceleration tube and comprises paired resiliently extendable hose pumps, one end of each respective hose pump within a pair being attached to respective opposite sides of the working piston and the other end of each hose pump within the pair attached to the acceleration tube or the buoyant body.

2. Wave energy converter according to claim 1, wherein the hose pumps within a pair are positioned on opposite sides of the working piston, with said one ends of the hose pumps being directly attached to the piston.

3. Wave energy converter according to claim 1, wherein both hose pumps within a pair are positioned between the working piston and the buoyant body, said one end of one hose pump being directly attached to the working piston and said one end of the other hose pump being attached to the working piston through the intermediary of a motion transmitting device.

4. Wave energy converter according to claim 1, further including relief passage means at the ends of the working cylinder controlled by the working piston to allow substantially unrestricted flow of water past the working piston in response to the working piston moving past a predetermined position at said ends.

* * * * *